US012104901B2

(12) United States Patent
Thyagarajan et al.

(10) Patent No.: US 12,104,901 B2
(45) Date of Patent: Oct. 1, 2024

(54) GEOMETRIC TOOLS AND METHODS TO MEASURE CLOSURE PHASE FOR ROBUST FEATURE RECOGNITION IN INTERFEROMETRIC IMAGES

(71) Applicant: Associated Universities, Inc., Washington, DC (US)

(72) Inventors: Nithyanandan Thyagarajan, Myaree (AU); Christopher L. Carilli, Socorro, NM (US)

(73) Assignee: Associated Universities, Inc., Washington, DC (US)

( * ) Notice: Subject to any disclaimer, the term of this patent is extended or adjusted under 35 U.S.C. 154(b) by 227 days.

(21) Appl. No.: 17/784,929

(22) PCT Filed: Jul. 9, 2021

(86) PCT No.: PCT/US2021/041038
§ 371 (c)(1),
(2) Date: Jun. 13, 2022

(87) PCT Pub. No.: WO2022/055608
PCT Pub. Date: Mar. 17, 2022

(65) Prior Publication Data
US 2023/0017478 A1    Jan. 19, 2023

Related U.S. Application Data

(60) Provisional application No. 63/144,564, filed on Feb. 2, 2021, provisional application No. 63/122,162, filed (Continued)

(51) Int. Cl.
*G01B 9/02001*    (2022.01)
*H04N 17/00*    (2006.01)

(52) U.S. Cl.
CPC ....... *G01B 9/02007* (2013.01); *H04N 17/002* (2013.01)

(58) Field of Classification Search
CPC ....... G01B 9/02055; G01N 21/45; G01J 3/45; H04N 17/002; H04N 23/81
See application file for complete search history.

(56) References Cited

U.S. PATENT DOCUMENTS

2008/0170225 A1* 7/2008 de Boer ............... G01B 9/0209
356/326
2009/0027689 A1* 1/2009 Yun ........................ G02F 1/093
356/485

(Continued)

*Primary Examiner* — Michael A Lyons
(74) *Attorney, Agent, or Firm* — Remenick PLLC

(57) ABSTRACT

Methods and systems of eliminating corrupting influences caused by the propagation medium and the data capture devices themselves from useful image features or characteristics such as the degree of symmetry are disclosed. The method includes the steps of obtaining image-plane data using a plurality of data capture devices, wherein the image-plane data is a combined visibility from each of the data capture devices, measuring the closure phase geometrically in the image-plane directly from the image-plane, removing the corruptions from the image features based on the measured closure phase to remove the non-ideal nature of the measurement process, and outputting the uncorrupted morphological features of the target object in the image.

12 Claims, 6 Drawing Sheets

Related U.S. Application Data on Dec. 7, 2020, provisional application No. 63/089,356, filed on Oct. 8, 2020, provisional application No. 63/082,144, filed on Sep. 23, 2020, provisional application No. 63/077,389, filed on Sep. 11, 2020.

(56) References Cited

U.S. PATENT DOCUMENTS

| | | | |
|---|---|---|---|
| 2014/0218684 A1* | 8/2014 | Kumar | A61B 3/0025 351/246 |
| 2015/0100279 A1* | 4/2015 | Ronnekleiv | G01D 5/3539 702/194 |
| 2017/0105618 A1* | 4/2017 | Schmoll | G01B 9/02032 |

* cited by examiner

US 12,104,901 B2

GEOMETRIC TOOLS AND METHODS TO MEASURE CLOSURE PHASE FOR ROBUST FEATURE RECOGNITION IN INTERFEROMETRIC IMAGES

REFERENCE TO RELATED APPLICATIONS

This is a National Stage Application of PCT Application No. PCT/US21/041038, filed Jul. 9, 2021, which application claims priority to U.S. Provisional Application Nos. 63/077,389, filed Sep. 11, 2020, 63/082,144, filed Sep. 23, 2020, 63/089,356, filed Oct. 8, 2020, 63/122,162, filed Dec. 7, 2020, and 63/144,564, filed Feb. 2, 2021, all hereby specifically and entirely incorporated by reference.

RIGHTS IN THE INVENTION

This invention was made with government support under Cooperative Agreement AST-1519126, between the National Science Foundation and Associated Universities, Inc., and, accordingly, the United States government has certain rights in this invention.

BACKGROUND

1. Field of the Invention

The invention is directed to a method for visualizing and measuring the interferometric closure phase using image domain measurements of the target object's geometry.

2. Background of the Invention

The closure phase, defined as the phase of the higher-order (≥3) closed-loop product of the spatial coherences measured in an interferometer array, has been a valuable tool for many decades in challenging applications requiring high-accuracy phase calibration of the measuring devices and the propagation medium. This is because the closure phase is invariant to phase corruption, subsequent phase calibration and errors therein, attributable to the individual coherent voltage detectors in the array, acquired during the propagation and the measurement processes.

The closure phase represents a true measurement of the properties of the target object's brightness distribution, independent of these detector-introduced phase terms. Hence, closure phase provides information on the true brightness distribution of the object, even prior to calibration of detector-based phase terms. In radio interferometry, closure phase is measured in the aperture domain, by comparing the measured phases of the three individual interferometric visibilities in a closed triangle of antennas. In optical interferometry, the three visibility phases can only be measured and tracked in the image domain, converted to effective aperture-plane visibilities per baseline using a Fourier transform of the image, then mathematically combined to obtain the closure phase in a similar way as for radio interferometers.

Interferometry is a widely employed imaging technique that provides high spatial resolution through cross correlation of electromagnetic signals from an array of detector elements. An interferometer measures the time-averaged cross correlation of the electric field voltages from pairs of data capture devices, designated as 'visibilities', $V_{ab}(\lambda)$, where $\lambda$ is the wavelength of the radiation, and $x_a$, $a=1, 2, \ldots, N$ denotes the positions of the N data capture devices. In radio astronomy, these devices are effectively phase-coherent voltage capture devices in the aperture plane. In optical interferometry, the "voltage capture devices" are mirror elements that reflect the light coherently toward the focal plane, where images are recorded using an array of image capture devices in the focal plane such as CCDs. The Van Cittert-Zernike theorem states that these visibilities represent Fourier components of the target object's brightness distribution, with the projected visibility fringe spacing and orientation (related to the 'spatial frequency'), determined by the reciprocal of the projected baseline vector between the array elements, $u_{ab}=x_{ab}/\lambda=(x_b-x_a)/\lambda$. The visibility relates to the spatial coherence of electric fields (measured as voltages) at each element, $E_a(\lambda)$, and the object's brightness distribution, $I(\hat{s}, \lambda)$, as:

$$V_{ab}(\lambda) = \langle E_a^*(\lambda) E_b(\lambda) \rangle = \int\int_\Omega^{Image} \Theta(\hat{s}, \lambda) I(\hat{s}, \lambda) e^{-i2\pi u_{ab} \cdot \hat{s}} d\Omega \quad (1)$$

where, the angular brackets indicate time average; $\hat{s}$, denotes a unit vector in the direction of any location in the image; $\Theta(\hat{s}, \lambda)$ denotes the array element's power response in the direction $\hat{s}$; and $d\Omega$ denotes the differential solid angle in the image-plane.

The voltages measured by the data capture devices are inevitably corrupted by complex-valued "gain" factors introduced by the intervening medium as well as the instrument response. The corrupted measurements are denoted by $E_a^m(\lambda) = G_a(\lambda) E_a^T(\lambda)$, where the superscript m denotes a measured quantity (i.e., corrupted by the medium and the instrument response), superscript T denotes the uncorrupted, true voltage from the target object, and $G_a(\lambda)$, known as the 'complex gain', denotes the net corruption factors to the voltage, introduced in the measurement process factorizable in such a way that it is attributable to the individual measuring devices. Thus, a calibration process, which determines $G_a(\lambda)$, is required to correct for these gains to recover the true electric fields.

Neglecting measurement noise, the measured visibility, $V_{ab}^m(\lambda)$, between two data capture devices, a and b, then becomes:

$$V_{ab}^m(\lambda) = G_a^*(\lambda) G_b(\lambda) V_{ab}^T(\lambda) = |G_a(\lambda)||G_b(\lambda)||V_{ab}^T(\lambda)| e^{i(\theta_b(\lambda)-\theta_a(\lambda)+\phi_{ab}^T(\lambda))}, \quad (2)$$

where, $V_{ab}^T(\lambda)$ is the true complex-valued visibility (spatial coherence) of the object in the image factorizable into its true amplitude, $|V_{ab}^T(\lambda)|$, and phase, $\phi_{ab}^T(\lambda)$. A visibility is the product of two electric fields, and has units of squared voltage, or power. Similarly, $\theta_a(\lambda)$ is the phase in the complex-valued gains, $G_a(\lambda)$, which denote voltage corruptions introduced by the propagation medium and the measuring device. The measured visibility phase, hereafter also referred to as the interferometric phase, is given by the visibility argument:

$$\phi_{ab}^m(\lambda) = \phi_{ab}^T(\lambda) + \theta_b(\lambda) - \theta_a(\lambda). \quad (3)$$

The 'bispectrum' or 'triple product' for an interferometric measurement for three data capture devices, a, b, and c, is defined as: $B_{abc}^m(\lambda) = V_{ab}^m(\lambda) V_{bc}^m(\lambda) V_{ca}^m(\lambda)$. It is straightforward to show that the argument, or phase, of the triple product for a closed triangle of data capture devices behaves as:

$$\phi_{abc}^m(\lambda) = \phi_{ab}^T(\lambda) + \theta_b(\lambda) - \theta_a(\lambda) + \phi_{bc}^T(\lambda) + \theta_c(\lambda) - \theta_B(\lambda) + \phi_{ca}^T(\lambda) + \theta_a(\lambda) - \theta_c(\lambda) \quad (4)$$

This is known as the 'closure phase' for a closed triangle of voltage capture devices. The device-based phase gain terms cancel in such a triple product, and the measured closure phase then equals the true closure phase without corruption, plus measurement noise:

$$\phi_{abc}^m(\lambda) = \phi_{abc}^T(\lambda) + \text{noise}. \quad (5)$$

The implication is that the measured closure phase is independent of the individual device-based calibration terms (or phase corruption terms), and represents a direct measurement of the true closure phase due to the spatial structure of the target object, modulo the contribution from the system thermal noise.

The closure phase measures the symmetry of the target object's spatial intensity distribution. It is translation-invariant. Closure phase has been widely applied in astronomical interferometric studies ranging from stellar photospheres to black hole event horizons, to infer properties of the object's morphologies in situations where measuring and tracking the voltage capture device-based calibration terms may be problematic.

In radio astronomy, the visibility phases are measured as the argument of the complex cross correlation products of voltages between antennas, as per Equation (1), where the voltages are measured via coherent amplification of the radio signals at each antenna in the aperture plane. These visibility phases can then be summed in closed triangles to produce closure phases. In optical interferometry, voltages in the aperture plane (meaning, at the individual telescopes or siderostats themselves), cannot be measured, and the baseline-pair visibilities are generated via optics, beam splitters, and beam combiners, which coherently reflect and interfere the light from different telescopes on a single focal plane (typically a CCD), producing the interference fringes. The phase and amplitude of the visibilities are then extracted through a Fourier analysis of the image, effectively returning the measurement to the aperture plane, and closure phases are generated through the argument of the visibility triple product, defined above.

SUMMARY OF THE INVENTION

The present invention provides new tools and methods of visualizing and measuring the closure phase in the image plane, thereby circumventing current aperture plane-methods for measuring closure phase. This image-plane method has potential advantages in certain applications of closure phase measurements for target object reconstruction and feature inference.

One embodiment of the invention is directed to a method of eliminating the corrupting influence of the propagating medium on the incident radiation and non-ideal behavior of the measuring apparatus from an image. The method comprises the steps of obtaining image-plane data using a plurality (for example, 3) of data capture devices, wherein the image-plane data is a linear combination of visibilities from each pair of the data capture devices. The closure phase is measured geometrically from the image-plane directly using the shape-orientation-size (SOS) characteristics and preservation of the principal triangle enclosed in a 3-element interference image, removing the corrupting influences of the propagation medium and the measurement devices from the image based on the measured closure phase, and outputting the uncorrupted target object's morphological characteristics.

From Equations (4) and (5), the corrupting influences of the individual voltage capture devices during the voltage measurement process are cancelled in a closure phase measurement, even without calibration. Preferably, the closure phase is not estimated in the aperture-plane. In a preferred embodiment, the image is a radio-frequency image or an optical image, obtained using an interferometer array of data capture devices.

Preferably, there are at least three data capture devices. The closure phase corresponds to an angular offset of an intersection of the null phase curves (NPC) of the visibilities of any two pairs of data capture devices from the NPC of the visibility of the third pair of the data capture devices. In a preferred embodiment, there are N data capture devices and the closure phase is obtained by summing the closure phases of the adjacent triads of data capture devices. The area enclosed by the three null phase curves of the visibilities of the three data capture devices in the image domain is preferably proportional to the closure phase squared divided by the area enclosed by the triad of data capture devices. Preferably, there are N data capture devices and the closure phase is based on the area within a closed loop of the N data capture devices. The output quantity is preferably a morphological feature of the target object's brightness density image such as the degree of symmetry in its spatial structure.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which:

FIG. 3A depicts interferometric fringes and phases, and closure phase on ideal (or perfectly calibrated) fringes, $F_{ab}(\hat{s}, \lambda)$. FIGS. 3B-C depict the same as the ideal case in FIG. 3A but when considering uncalibrated (FIG. 3B) and translated fringes (FIG. 3C).

DESCRIPTION OF THE INVENTION

Figure 1:
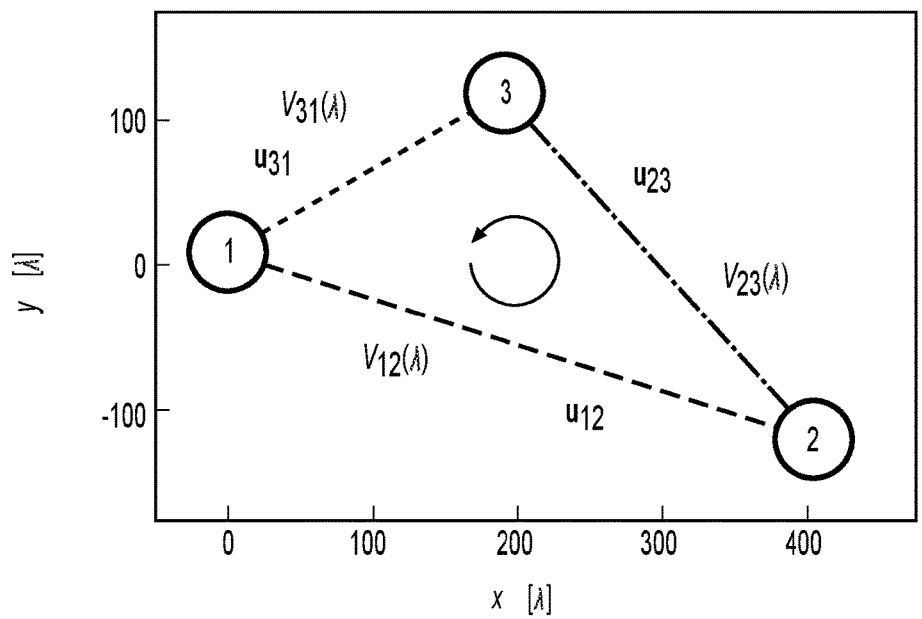
FIG. 1 depicts a triad of data capture devices (voltage detectors in the case of radio interferometry) depicted in the aperture plane, meaning, the plane containing the voltage capture devices.

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Methods of visualizing and measuring the closure phase directly from images made with the combined visibilities ('fringes') for three baselines in a closed interferometric triangle are disclosed. This image-based method results in a measurement of the closure phase, using images, without recourse to aperture-plane visibility phases for the separate baselines. An analytical formalism is developed to measure the closure phase geometrically in the image-plane from measurements on a generic N-polygon array of data capture devices (interchangeably referred to as voltage detectors in radio interferometry) in the aperture-plane. Using the simplest polygon (a triangle) of detectors, a gauge invariant relation is derived between the area enclosed by the detectors in the aperture-plane, the area enclosed by the interferometer responses ("fringes") in the image-plane, and the closure phase. The efficacy of the technique using both model data, and real observations made with the Jansky Very Large Array (JVLA) radio telescope as well as with the Event Horizon Telescope (EHT) interferometer array is demonstrable.

The methods may be useful in interferometry and remote sensing (passive and active). For example in radio wave applications such as interferometry at low and high frequency, where calibration may be problematic, a self-calibration technique using image-plane based closure phases can be applied entirely in the image domain to obtain high-dynamic range images; in gravitational wave interferometry; in seismic imaging; in radar imaging; in satellite imaging (i.e. space situational awareness, surveillance); and in ground imaging from space (i.e. climate, geology, general mapping, surveillance). As additional examples, in remote optical sensing, such as in optical and near-IR interferometry for both space and ground; in satellite imaging (i.e. space situational awareness, surveillance); and in ground imaging from space (i.e. climate, geology, general mapping, surveillance). In another example, in general imaging or spectroscopy applications using interferometric devices such as medical imaging, sonar interferometry, surveillance, and security screening.

Disclosed are two geometrical methods to determine closure phase in the image plane directly from the image of three fringes, without resorting to the individual visibilities themselves in the Fourier domain (aperture plane). This method may have computational or practical advantages for calculating closure phase in interferometric imaging applications involving robust identification of structural features, as closure phase is a largely incorruptible measure of the true morphological properties of the object being imaged. The methods preferably provide an understanding to visualize a difficult concept, which could spawn new applications in various fields and disciplines. The measurement method may be employed from a triad of array elements to N elements, where N is any number≥3.

Geometric Embodiments to Measure Closure Phase in the Image Domain

Consider the three fringes, $F_{ab}(\hat{s}, \lambda)$, in the image-plane corresponding to $V_{ab}(\lambda)$ measured on a triad of data capture devices (voltage detectors in radio interferometry) indexed a=1, 2, 3, and b=(a+1) mod 3 in the aperture-plane as shown in FIG. 1. The null phase curves (NPC) for each of these fringes is given by:

$$2\pi u_{ab} \cdot \hat{s} + \psi_{ab}(\lambda) = 0, a=1,2,3, b=(a+1) \bmod 3. \quad (6)$$

Figure 2:
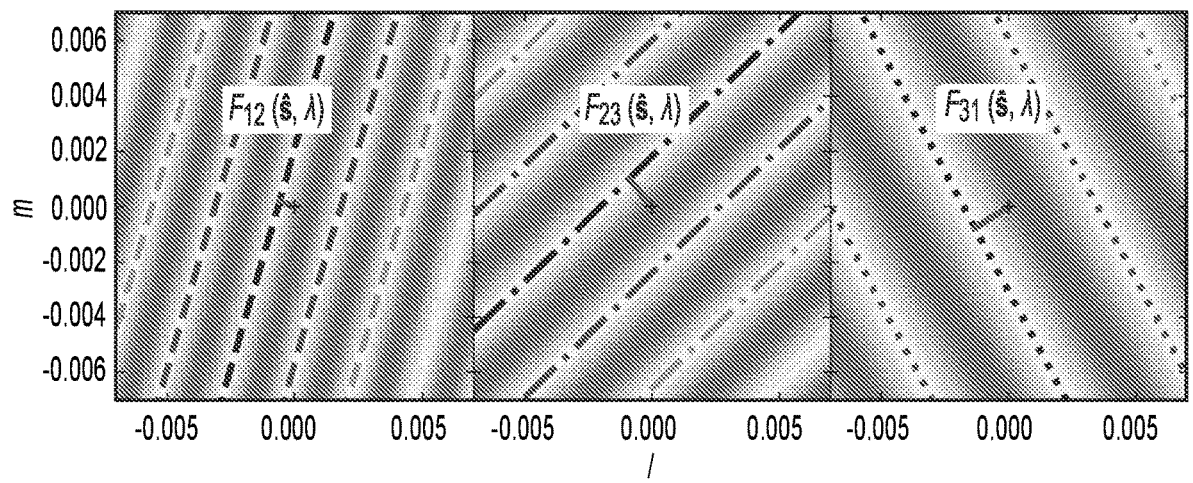
FIG. 2 depicts ideal fringes (in map and annotated by $F_{ab}(\hat{s}, \lambda)$) and the respective NPCs (lines) in the image-plane in direction-cosine (l, m) coordinates, with the line style in each panel corresponding to that of the detector spacings, $u_{ab}$, in FIG. 1.

FIG. 2 shows the fringe NPCs for visibilities modeled for the detector spacing shown in FIG. 1. The three fringes, $F_{ab}(\hat{s}, \lambda)$, are shown as a map and the NPCs are shown as black (principal fringe) and gray (secondary fringes differ in phase from the principal fringe by multiples of $2\pi$) according to Equation (6) with the line styles corresponding to that in FIG. 1. The principal fringes enclose the "principal triangle" (shown by the gray shaded region).

The closure phase on this triad of data capture devices is $$\psi_3(\lambda) = \sum_{a=1}^{3} \psi_{ab}(\lambda), b = (a+1) \bmod 3, \quad (7)$$

which is the sum of the phase offsets, $\psi_{ab}(\lambda)$, of the individual fringe NPCs from the phase center (origin in the image domain) Geometrically, the phase offsets are preferably obtained by measuring the angular distance along the perpendiculars dropped from the phase center to each of these fringe NPCs normalized by the respective fringe spacing along the perpendiculars, times $2\pi$ (see Equation (9) for the mathematical expression). For a calibrated interferometer, these measured phase offsets from the phase center for the fringes relate directly to the position of the target object on the sky, modulo $2\pi$. The interferometric phases correspond to the angular offsets represented by the short gray line segments from the phase center (denoted by the + marker) in FIG. 2.

Figure 3:
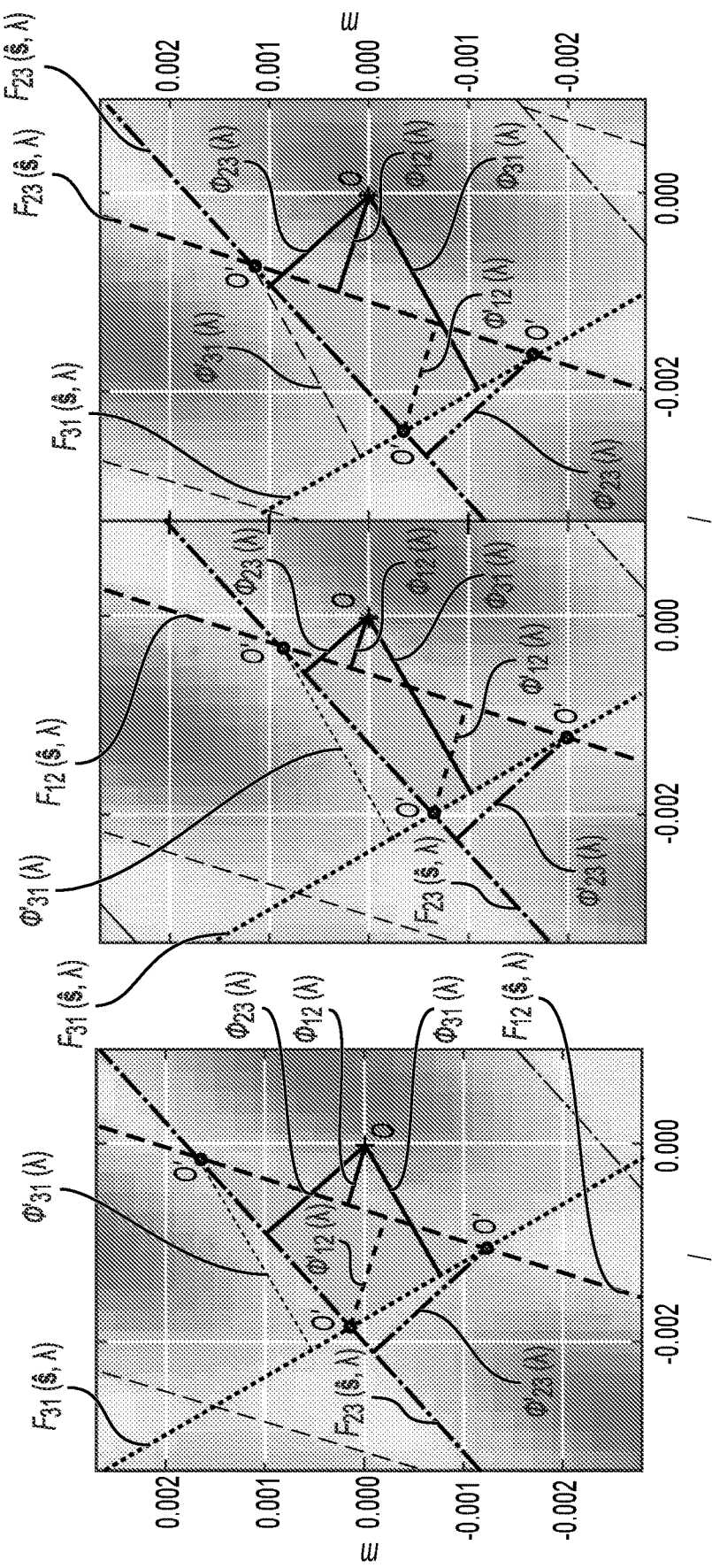
FIGS. 3A-C depict illustrations of the gauge-invariant nature of the closure phase.

If the phase center is shifted or if the visibilities (spatial coherence of the electric fields measured by the voltage capture devices) have corrupted phases introduced by the propagation medium or the detector response, the closure phase measured with respect to the new phase center remains unchanged because of its translation invariance property (see Equations (4) and (5), and FIGS. 3A-C). The phase center, $\hat{s}_0$, can be conveniently chosen to be at the point of intersection of any of the two fringe NPCs (or equivalently, any vertex of the principal triangle), for instance, $F_{12}(\hat{s}, \lambda)$ and $F_{23}(\hat{s}, \lambda)$. Because $\hat{s}_0$ lies on both $F_{12}(\hat{s}, \lambda)$ and $F_{23}(\hat{s}, \lambda)$, the interferometric phase offsets of these two fringes relative to the shifted phase center vanish, $\psi_{12}'(\lambda) = \psi_{23}'(\lambda) = 0$. Therefore, the closure phase is equal to the remaining interferometric phase, namely, that of the third fringe, $$\psi_3(\lambda) = \psi_3'(\lambda) = \psi_{31}'(\lambda). \quad (8)$$

Thus, when the phase center is chosen to be at the intersection of any of the two fringe NPCs, the closure phase has a simple relation:

$$\psi_3(\lambda)=\psi_{ab}'(\lambda)=2\pi|u_{ab}|\delta s_{ab}'(\lambda), a=1,2,3, b=(a+1)\bmod 3, \quad (9)$$

where, $\delta s_{ab}'(\lambda)$ is the angular separation of the intersection vertex, which is now the chosen phase center, from the opposite fringe NPC corresponding to $F_{ab}(\hat{s}, \lambda)$ along its perpendicular. In simple terms, $\delta s_{ab}'(\lambda)$ corresponds to the height of the triangle from the chosen vertex to the opposite side. The same relation can be used to infer the interferometric phases as well by using $\delta s_{ab}'(\lambda)$ to measure the angular offset from the phase center.

FIGS. 3A-C demonstrate that the closure phase can be measured from the angular offset of any one of the intersection vertices to the opposite fringe NPC using Equation (9). They also show that when the fringes are uncalibrated or translated in the image domain, the fringes shift parallel to themselves while remaining constrained to preserve the shape, size, and orientation of the triangle enclosed by the fringes. This will be hereafter referred to as the "triangle SOS conservation principle". As a result, the closure phase also remains invariant to phase corruption and translation, and can be calculated geometrically in the image-plane, even from corrupted data as described above, without the need for calibration.

The three fringe NPCs reduces to three straight lines given by Equation (6). In general, there are three vertices for the principal triangle formed by the three points of intersection, one for each pair of the fringe NPCs. The area of the triangle enclosed by the three points of intersection between the three fringe NPCs in the image domain, $A_{I3}(\lambda)$, is related to the closure phase, $\psi_3(\lambda)$, and the area enclosed by the triad of data capture devices in the aperture plane, $A_{A3}(\lambda)$ in units of wavelength squared, by:

$$\psi_3^2(\lambda)=16\pi^2 A_{A3}(\lambda) A_{I3}(\lambda). \quad (10)$$

The subscripts A and I denote the aperture- and image-plane, respectively, and the subscript 3 denotes a triangle (3-polygon). Therefore, the product of the area enclosed by the triad of data capture devices in the aperture domain and the area enclosed by the three fringe NPCs in the image domain is gauge invariant and proportional to the closure phase squared. FIGS. 3A-C confirm that the SOS characteristics of the triangle enclosed by the fringes are not affected by mis-calibration or translation. This demonstrates that closure phase is directly related to the SOS characteristics of the triangle.

Thus, there are two geometrical methods to visualize and measure the closure phase in the image domain unlike the usual practice of measuring it from the aperture domain, namely:

1. The phase offset corresponding to the height of a vertex from its opposite side in a 3-element interference image according to Equation (9); and
2. The area enclosed by the principal triangle in the image domain is proportional to the closure phase squared divided by the area enclosed by the triad of data capture devices in the aperture-plane, according to Equation (10).

While it has been known that closure phase can be constructed from individual image plane measurements of the fringe phase via the NPC offset from a fixed position on the three individual fringe images separately, then summing these phases as in the aperture plane, the two methods described herein bypass such a need for three measurements in two ways: (i) in the case of the distance from a vertex method on a three fringe image, preferably only one fringe offset (=phase) need be measured to derive the closure phase, (ii) in the fringe triangle area method, this again requires only a single observation, namely a three fringe image, to obtain the closure phase.

Returning to the figures, FIG. 1 depicts a triad of data capture devices (voltage detectors in the case of radio interferometry) depicted in the aperture plane, meaning, the plane containing the voltage capture devices. The detector spacings projected in a plane perpendicular to the direction of the target object, $u_{ab}$, are in units of wavelengths, with a=1, 2, 3, and b≠a. $u_{ab}$ represents the spatial frequencies of the image-domain intensity distribution, $I(\hat{s}, \lambda)$, in the aperture plane. $V_{ab}(\lambda)$ denotes the complex-valued spatial coherence of $I(\hat{s}, \lambda)$ measured at $u_{ab}$ in the aperture-plane. The cyclic ordering of the detector spacings is indicated by the arrowed (anti-clockwise) circle, although the ordering can be reversed. The three spatial frequencies, $u_{ab}$, are shown by dashed, dash-dotted, and dotted lines, which will be used to denote the corresponding fringe NPC in the image-plane in subsequent figures.

FIG. 2 depicts ideal fringes (in map and annotated by $F_{ab}(\hat{s}, \lambda)$) and the respective NPCs (lines) in the image-plane in direction-cosine (l, m) coordinates, with the line style in each panel corresponding to that of the detector spacings, $u_{ab}$, in FIG. 1. Equation (6) yields the fringe NPCs. The black lines in each line style corresponds to the principal fringe NPC, while the varying shades of gray correspond to secondary fringe NPCs that differ in phase from the principal fringe by multiples of $2\pi$. The phase center (origin) is marked (with a + symbol). The offset from the phase center to each of the principal fringe NPCs is shown as the short gray line segments and is related to the interferometric phase, $\phi_{ab}(\lambda)$, by Equation (9).

FIGS. 3A-C depict illustrations of the gauge-invariant nature of the closure phase. FIG. 3A: Interferometric fringes and phases, and closure phase on ideal (or perfectly calibrated) fringes, F_ab (s^,λ). The three principal fringe NPCs are annotated and shown in black lines with the line style corresponding to that in FIGS. 1 and 2. They enclose the principal triangle marked by the shaded region. Any gray lines are secondary fringe NPCs. The three principal interferometric phases, φ_ab (λ), are proportional to the angular offsets (see Equation (9)) shown in dark, continuous black line segments from the phase center (origin) marked by + and annotated by O. The principal closure phase, φ_3 (λ), is the sum of the three corresponding principal interferometric phases, φ_ab (λ). The phase center can be conveniently shifted to be any one of the triangle's vertices, O^', in which case the closure phase reduces simply to φ_3 (λ)=φ_ab^' (λ), which are shown corresponding to the heights drawn from the vertex to the opposite side in marked as φ_12^', φ_23^', and φ_31^', respectively, according to Equation (9). The area enclosed by the three principal fringe NPCs (the triangle enclosed by the three vertices each denoted O^') is proportional to the closure phase squared (see Equation (10)). FIGS. 3B-C: Same as the ideal case in FIG. 3A but when considering uncalibrated (FIG. 3B) and translated fringes (FIG. 3C). As a result, all the fringe NPCs are displaced parallel to themselves relative to the phase center compared to the ideal case. The closure phase, which is still the sum of the three uncalibrated or translated interferometric phases (corresponding to the offsets in the dark, continuous black line segments), remains unchanged. Equivalently, the closure phase which is proportional to the triangle's heights (line segments marked φ_12^', φ_23^', and φ_31^') are independent of these displacements as well as of the phase center. Though the fringes and the triangle enclosed by them are displaced, their displacements are constrained to be parallel to themselves with the only degree of freedom being translation, thereby preserving the same shape, orientation, and size. This shape-orientation-size (SOS) preservation, its invariance to detector-based phase corruption, and overall translation in the image-plane demonstrates the gauge-invariance of the closure phase.

Figure 4:
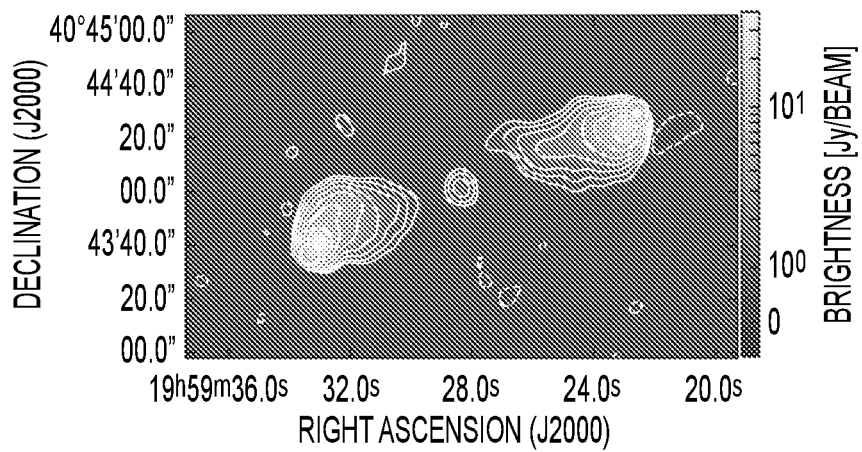
FIG. 4 depicts the synthesized image of a powerful radio galaxy, Cygnus A, from 4 min and 128 MHz of JVLA data at $\lambda$=3.75 cm.

FIG. 4 depicts the synthesized image of a powerful radio galaxy, Cygnus A, from 4 min and 128 MHz of JVLA data at $\lambda=3.75$ cm. Cygnus A has a complex structure at these wavelengths: a bright core centered on the active galactic nucleus (AGN) and two bright and non-symmetric lobes, classified as FR-II morphology. The angular resolution of the image ("beam size") is $\approx 8''$. The contours correspond to $-2.5$ $\sigma$(dashed), 2.5 $\sigma$, 5 $\sigma$, 10 $\sigma$, 20 $\sigma$, 40 $\sigma$, 80 $\sigma$, 160 $\sigma$, and 320 $\sigma$, where, $\sigma\approx 0.1$ Jy/beam is the RMS of noise in the image. The gray scale bar uses a "symmetric" logarithmic scale to represent both negative and positive values of brightness.

Figure 5:
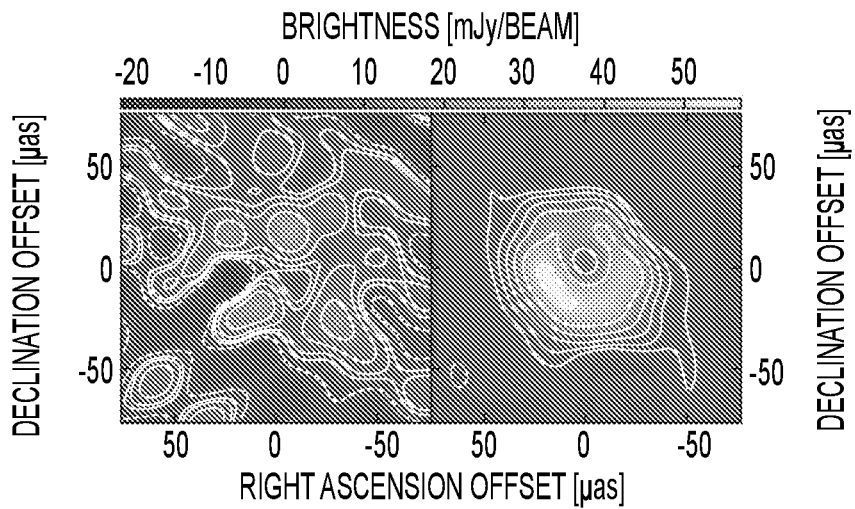
FIG. 5 depicts images of M87 made using the publicly available Event Horizon Telescope data at 229.1 GHz.

FIG. 5 depicts images of M87 made using the publicly available Event Horizon Telescope data at 229.1 GHz. (Left): Images from the 'network-calibrated' data, i.e., with just a priori flux density and delay calibration. (Right): Images after hybrid mapping (iterative imaging and self-calibration), using a starting model consisting of an annular ring for the first iteration of phase self-calibration, although the final image, and in particular, the ring-like structure, is robust to changes in the starting model (e.g., point source, Gaussian, disk, etc.). The angular resolution of the image is $\approx 20$ µas. The contour levels of surface brightness progress geometrically in factors of two. The contours correspond to $-3\sigma$(dashed), 3 $\sigma$, 6 $\sigma$, 12 $\sigma$, 24 $\sigma$, 48 $\sigma$, and 96 $\sigma$, where, $\sigma\approx 0.51$ mJy/beam is the RMS of noise in the self-calibrated image. The gray scale bar uses a linear scale as indicated on the top.

Figure 6:
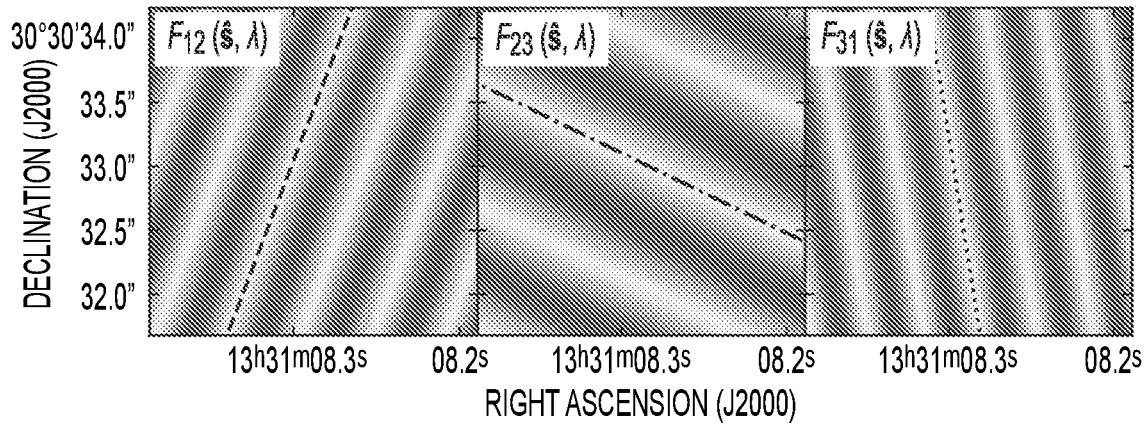
FIG. 6 depicts the three fringe patterns (maps and annotated by $F_{ab}(\hat{s}, \lambda)$) and the fitted fringe NPCs (black lines) in the image-plane for the uncalibrated 3C286 data at $\lambda$=3.2 cm with the JVLA.

FIG. 6 depicts the three fringe patterns (maps and annotated by $F_{ab}(\hat{s}, \lambda)$) and the fitted fringe NPCs (black lines) in the image-plane for the uncalibrated 3C286 data at $\lambda=3.2$ cm with the JVLA. The three line styles correspond to the projected detector spacings of 7.5 km, 12.4 km, and 15 km. The x- and y-coordinates are in Right Ascension and Declination, which are closely related to the direction-cosine coordinate system used in FIGS. 2 and 3.

Figure 7:
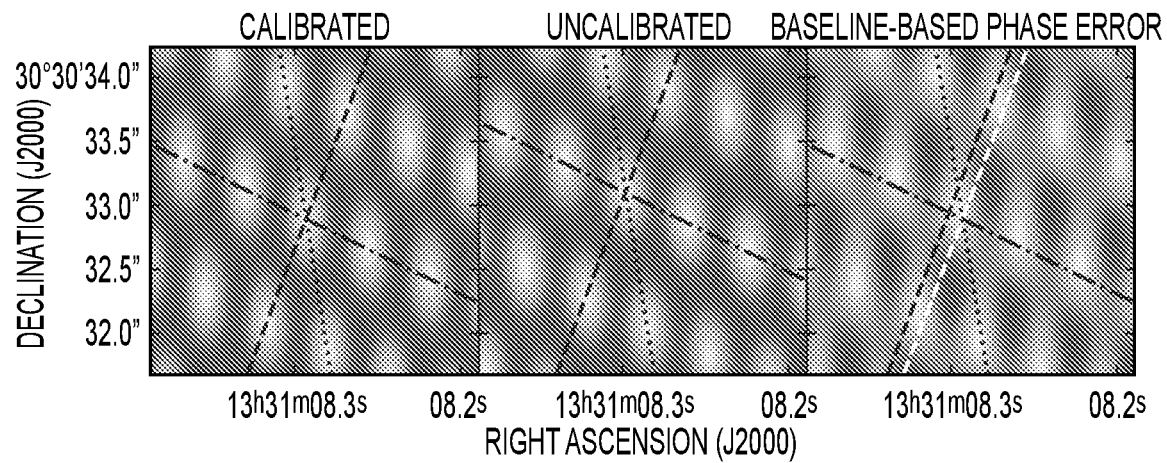
FIG. 7 depicts images made with the superposition of the three fringe patterns shown in FIG. 6 from calibrated (left), uncalibrated (middle), and baseline-dependent phase-corrupted 3C286 data (one visibility phase corrupted by 80°) from the JVLA using the same black-colored line styles as before for the principal fringe NPCs.

FIG. 7 depicts images made with the superposition of the three fringe patterns shown in FIG. 6 from calibrated (left), uncalibrated (middle), and baseline-dependent phase-corrupted 3C286 data (one visibility phase corrupted by 80°) from the JVLA using the same black-colored line styles as before for the principal fringe NPCs. The calibrated and uncalibrated three-fringe interference patterns look identical except that the lack of calibration results in a net displacement of the interference pattern by 0.2" relative to the calibrated fringes, which indicates the magnitude of the required phase calibration terms. Independent of calibration, the principal fringe NPCs in both cases are nearly coincident with each other which geometrically confirm that 3C286 has a highly compact structure, such that the principal closure phase, $\phi_3$ ($\lambda$)$\approx 0$ as expected, and remains invariant even when the element-based instrumental and tropospheric phase corruption terms remain undetermined. A baseline-dependent phase error (80°, relative to the calibrated case) on one of the visibilities results in a shifting of the fringes corresponding to that corrupted visibility (from the uncorrupted fringe NPC shown in white dashed line to the corrupted fringe NPC in black dashed line), while the other two remain unchanged. The resulting three-fringe interference pattern is very different from the other two panels, and the fringe NPCs are no longer coincident as evident from the non-zero area of the triangle enclosed by the three black lines, and hence, the closure phase, $\phi_3$ ($\lambda$)$\neq 0$ even for 3C286, a point-like source. Thus, in the presence of baseline-dependent phase errors, the SOS conservation does not apply to the enclosed triangle, and the three-fringe interference image is no longer a true physical observable.

Figure 8:
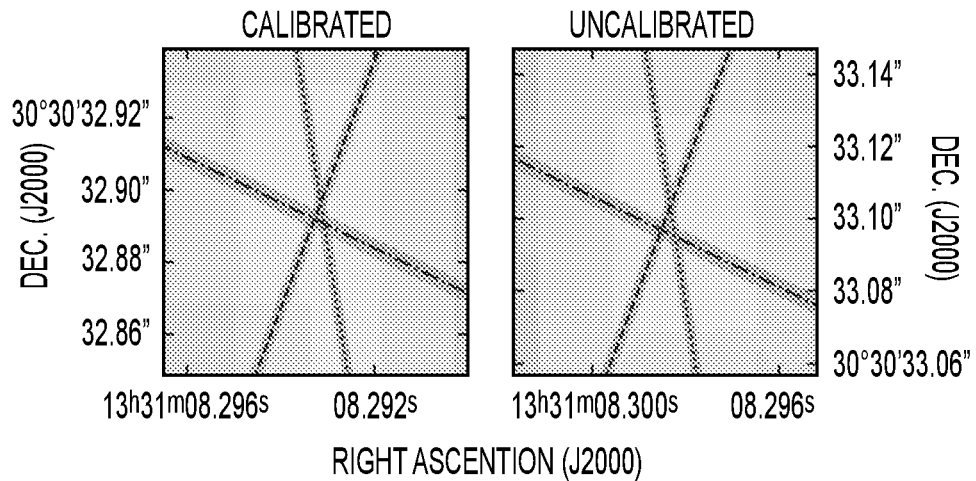
FIG. 8 depicts a zoomed-in view of the left and middle panels in FIG. 7.

FIG. 8 depicts a zoomed-in view of the left and middle panels in FIG. 7. The gray-shaded regions indicate twice the RMS uncertainties in the determined positions of the fringe NPCs, which depend on the RMS phase errors [$\approx$(S/N)$^{-1}$ when S/N$\gg$1] in the measured visibilities, as guided by Equation (9). In this case, S/N$\approx 133$. The level of these uncertainties imply that the differences in the measured closure phases (based on both the principal triangle's height given by Equation (9), and the areas enclosed by the three fringes given by Equation (10)) using the calibrated and the uncalibrated cases, are statistically consistent with each other and are also consistent with $\phi_3(\lambda)=0$.

Figure 9:
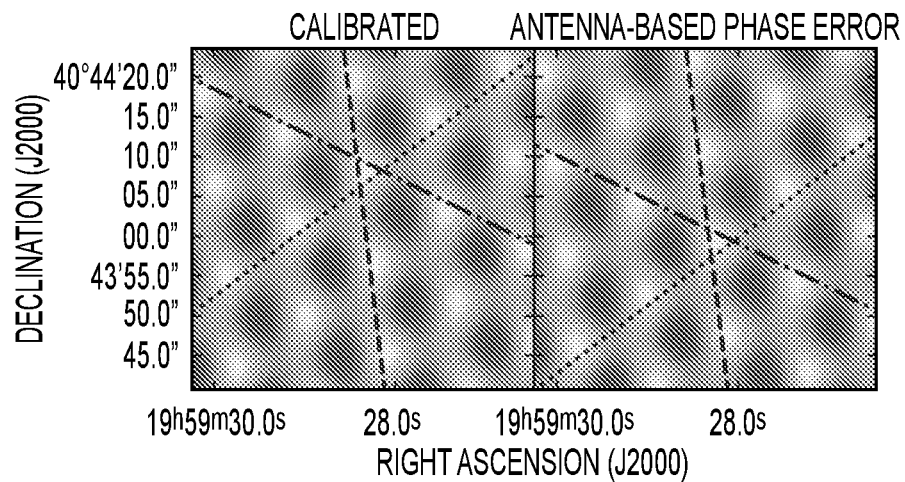
FIG. 9 depicts the three-fringe interference pattern for Cygnus A data.

FIG. 9 depicts the three-fringe interference pattern for Cygnus A data. The phase corruption of one antenna measurement results in the parallel displacement of the interference pattern relative to the calibrated fringes, which indicates the magnitude of the required phase calibration terms. Independent of calibration, the principal fringe NPCs in both cases are clearly non-coincident with each other which geometrically confirms that Cygnus A has a complex structure (see FIG. 4) in contrast to 3C286. Gray-shaded regions indicate twice the RMS uncertainties in the determined positions of the fringe NPCs as determined from Equation (9), but they are barely visible due to the high S/N ($\gtrsim 275$) in the visibilities. The closure phase calculated from the principal triangle's heights is $\phi_3$ ($\lambda$)$\approx 112.9°$ with an RMS uncertainty of $\approx 1.5°$, and remains invariant even after the element-based phase of one antenna measurement was corrupted by 80°. $\phi_3$ ($\lambda$) estimated from the area relations are $\approx 112.5°$ and $\approx 113.7°$ from the calibrated and uncalibrated fringe NPCs, respectively. In terms of visualizing closure phase, these images show clearly the SOS conservation theorem, meaning that, for a closed triad of array elements, the resulting images are a true representation of the sky brightness distribution, independent of element-based phase corruption, besides an overall translation of the pattern. If the phase error was dependent on the baseline vector instead of an antenna, only one of the NPCs that corresponds to the affected baseline will be displaced while the other two will remain unchanged and unconstrained by this phase perturbation, thereby changing the size of the resulting triangle in the image plane, as demonstrated in the case of 3C286 in the right panel of FIG. 7. Thus, in the presence of a baseline-dependent phase error, the SOS conservation theorem will not apply.

Figure 10:
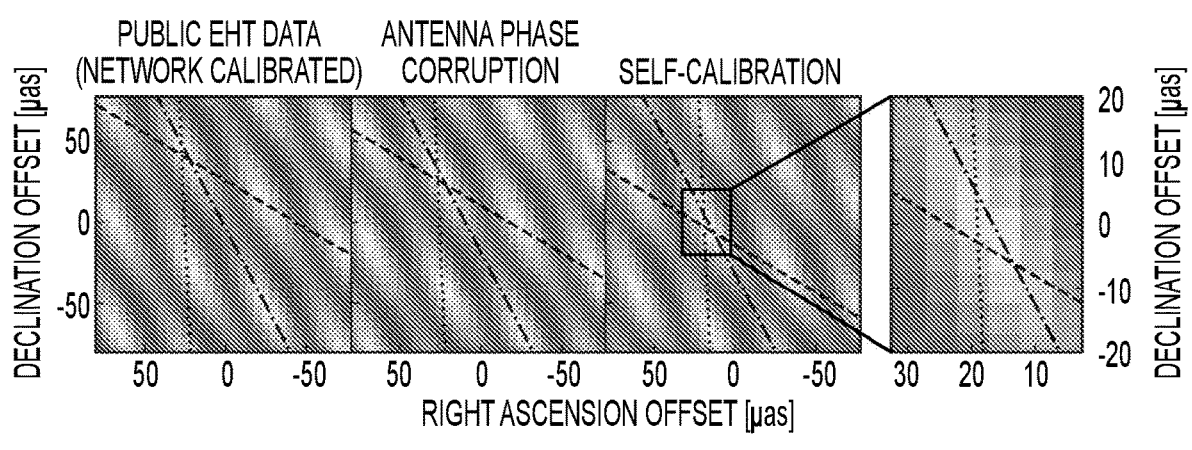
FIG. 10 depicts the three-fringe interference images of M87 using a snapshot (1 min) of data from the EHT at 229.1 GHz.

FIG. 10 depicts the three-fringe interference images of M87 using a snapshot (1 min) of data from the EHT at 229.1 GHz. The stations involved are: ALMA, the LMT, and the SMA. The first panel (from left) shows the three-fringe interference pattern from the public EHT data on M87 that has a priori flux density scale and delay calibration applied. The second panel corresponds to the public data but with one element (ALMA) phase corrupted by 80°. The third panel is obtained by hybrid-mapping and self-calibration. The three-fringe interference pattern is found to be the same across these panels except for an overall translation relative to each other. The fourth panel is an inset showing the zoomed-in view of the self-calibrated three-fringe interference pattern in the third panel. The fringe NPCs enclose a triangle of a finite area, thereby indicating a non-zero value for closure phase that was estimated from the image plane to be ≈38.8° and ≈38.5° from the "principal triangle's height" and "product of areas" methods, respectively. These agree, within errors, with the value of ≈37.5° derived from the aperture plane measurements (i.e., the visibilities). Besides confirming that the three-fringe interference pattern remains the same except for relative overall shifts, these closure phase estimates were found to be consistent between the three panels denoting different degrees of calibration accuracy, thereby verifying the SOS conservation theorem.

Figure 11:
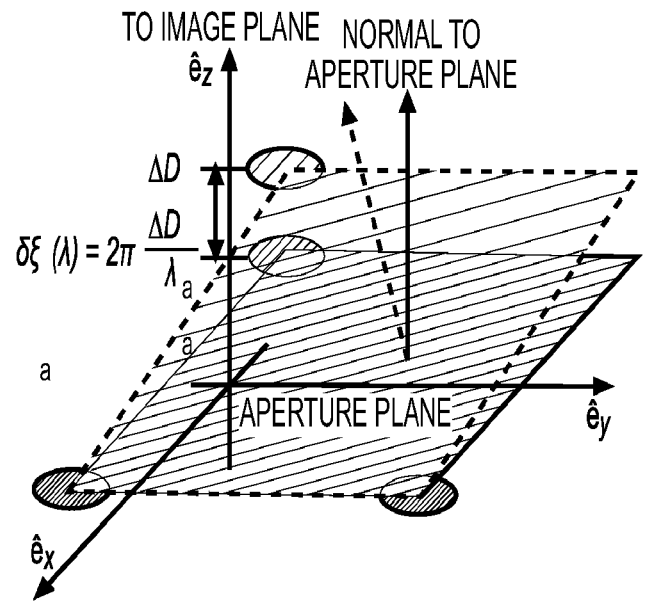
FIG. 11 shows a schematic representation of what occurs when the electronic phase of one element in a closed triad is corrupted.

FIG. 11 shows a schematic representation of what occurs when the electronic phase of one element in a closed triad is corrupted. The three dark circles indicate the elements in the aperture plane (in dark shade of gray), assumed to be on the Z=0 plane, whose normal vector is indicated by the thick, solid upward arrow. These apertures can be considered unmasked regions in an aperture mask of an optical telescope, or radio antennas in a radio interferometer. The radiation is then directed from the elements to the focal (image) plane, wherein a three-fringe image is synthesized by the interference of the EM waves. Consider a phase corruption of one array element (indexed by a) by an amount $\delta\zeta_a(\lambda)$. Such a phase corruption is equivalent to a change in path length, $\Delta D_a$, related by $\delta\zeta_a(\lambda)=2\pi(\Delta D_a/\lambda)$, from that aperture element to the focal plane. Since three (non-colinear) points determine a plane, one can visualize this phase corruption, or the extra path length, at one of the aperture elements as a tilting of the aperture plane relative to the original. The tilted aperture plane and its normal are shown by the light gray-shaded region and the dashed arrow, respectively. Such a tilt then directs the light in a different direction, leading to a shift of the interference pattern in the image plane. Each of the fringes from baselines that contain the phase-corrupted aperture element will be subject to a position offset in the image plane given by Equation (9). Except for the overall shift, the three-fringe pattern, including the SOS characteristic, is conserved. This argument can be generalized to a scenario when all the three aperture elements in a triad are subject to random phase corruption (i.e., not just a phase gradient across the elements), because the three virtually phase-displaced elements will still define a tilted plane that results in a translation, while obeying SOS conservation.

Figure 12:
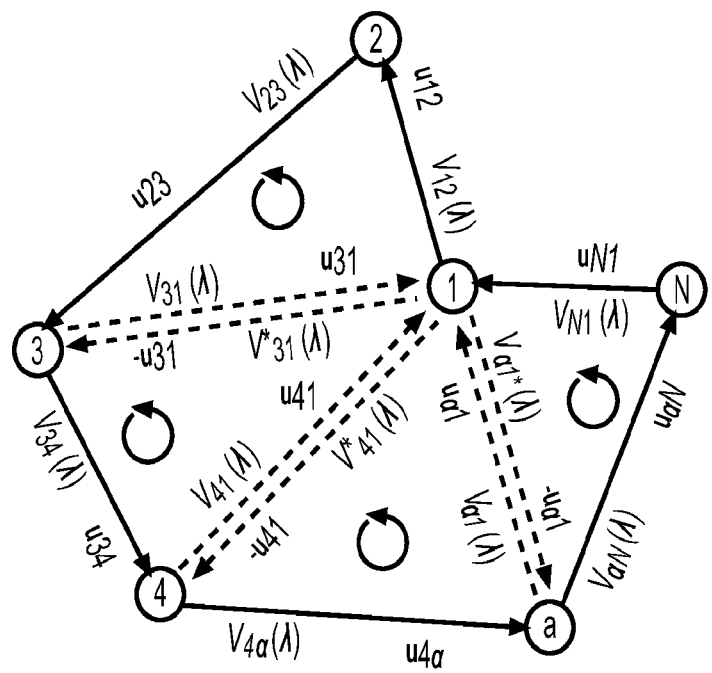
FIG. 12 depicts an aperture-plane view of an N-polygon array of data capture devices (voltage detectors in radio interferometry), indexed by a=1, 2, . . . N.

FIG. 12 depicts an aperture-plane view of an N-polygon array of data capture devices (voltage detectors in radio interferometry), indexed by a=1, 2, . . . N. The detector spacing in wavelength units (or spatial frequencies) and the corresponding spatial coherence are indicated by $u_{ab}$ and $V_{ab}(\lambda)$, respectively, on the adjacent sides. By choosing a vertex (indexed by 1 in this case), adjacent triads sharing this common vertex and having one overlapping side (shown by dashed lines) with the next triad can be defined, each with its own closure phase, $\psi_{3(q)}(\lambda)$, q=1, 2, . . . , N−2. The closure phase on the N-polygon is the sum of the closure phases on these adjacent triads with a consistent cyclic rotation of the vertices as indicated by the arrowed circular arcs, $\psi_N(\lambda)=\Sigma_{q=1}^{N-2}\psi_{3(q)}(\lambda)$.

EXAMPLES

Real-World Demonstration Using Data from Radio Interferometer Arrays

Described here are three examples of the image-domain closure phase visualization and measurement method, two using data from the Jansky Very Large Array (JVLA) telescope, and another using the Very Long Baseline Interferometer array comprising the Event Horizon Telescope (EHT). The JVLA is a radio interferometer in New Mexico, comprised of 27 antennas of 25 m diameter, arranged in a Y-pattern. The EHT array consists of seven telescopes spanning the globe, including Europe, South America, continental USA, and Hawaii.

In the first example, the JVLA was employed in its largest configuration ("A configuration") to observe at $\lambda$=3.2 cm (v=9.4 GHz) the target object 3C286, which has a compact core-jet structure and is the dominant source of emission in the field of view. Three antennas (the phase-coherent voltage capture devices or voltage detectors) were selected from the array, corresponding to a triangle with projected spacings (also referred to as baselines in radio interferometry) of 7.5 km, 12.4 km, and 15.0 km.

In the second example, JVLA observations were made at $\lambda$=3.75 cm (v=8 GHz) of the bright, extended radio galaxy, Cygnus A, which has a total flux density of 170~Jy at this wavelength, and is noted to have complex spatial structure typical of an FR-II morphology (edge-brightened with bright hotspots at the outer edges of their lobes). The observations were made in the 'D' configuration of the VLA, which has a longest baseline length of approximately 1 km, corresponding to a spatial resolution of 8 arcseconds. Three baselines were chosen in a rough equilateral triangle for estimating the closure phase, with baseline lengths of 797.1 m, 773.7 m, and 819.7 m, with correlated flux densities of 22.7 Jy, 26.4 Jy, and 38.3 Jy, respectively.

As a third example, data provided by the VLBI-based EHT observations made at approximately v=230 GHz of the nuclear regions of the nearby radio galaxy, M87 (Virgo A), with the goal of imaging the event horizon of the hypothesized supermassive black hole was analyzed. The synthesized image shows a non-trivial asymmetric ring structure with a depression in the middle indicating the shadow of the black hole and the ring corresponding to the event horizon. The most sensitive closed triad in the EHT array, namely, the baselines between the Atacama Large Millimeter Array (ALMA), the Large Millimeter Telescope (LMT), and the Submillimeter Array (SMA) was selected.

The three examples used are intended to verify the accuracy of the technique described here when applied to a wide range of real-world conditions, each with its own complexity of spatial structure, observational and technical challenges. 3C286 in example 1 has a point-like morphology. FIGS. 4 and 5 show the synthesized images of Cygnus A (FR II morphology), and M87 (asymmetric ring near the event horizon scale) in examples 2, and 3, respectively. Table 1 summarizes the observation details of the three examples considered.

TABLE 1

Observational and target object's morphological parameters in the three examples.

| Observational Parameter | Example 1 | Example 2 | Example 3 |
|---|---|---|---|
| Target Object | 3C286 | Cygnus A | Center of M87 |
| Morphology | Point-like | Edge-brightened double lobes | Asymmetric ring |
| Telescope array | JVLA | JVLA | EHT |
| Frequency | 9.4 GHz | 8 GHz | 230 GHz |
| Triad Spacings | 7.5 km, 12.4 km, 15.0 km | 0.797 km, 0.773 km, 0.82 km | 5380 km, 9310 km, 880 km |

TABLE 1-continued

Observational and target object's morphological parameters in the three examples.

| Observational Parameter | Example 1 | Example 2 | Example 3 |
|---|---|---|---|
| Bandwidth processed | 20 MHz | 8 MHz | 1.9 GHz |
| Time duration | 20 s | 8s | 60s |
| S/N | 133 | >275 | 4-5 |

Geometrical Methodology for Measuring of Closure Phase in the Image-Domain Using Real Data from Radio Interferometer Arrays In each of the examples, the closure phase was geometrically measured as follows:

1) Determine the three fringe NPCs as follows:
   a. Combine each pair (three possible pairs) of fringes and determine their intersection points (vertices of the triangle) in the image-domain, through the detection of interference maxima in the two-fringe image, for instance. Each of these vertices can be treated as a new phase center, $\hat{s}_0$. See FIGS. 6 and 3.
   b. Using the projected antenna spacings, construct the three fringe NPCs that pass through their corresponding intersection points with the other fringes, using Equation (6).
2) Determine the perpendicular angular offset of any one of these three intersection points from the corresponding fringe NPC opposite to it (or equivalently, any one of the heights of the triangle), which yields $\delta s_{ab}'(\lambda)$ in Equation (9). See FIGS. 3, 7, 8, 9, and 10.
3) Using the value of $\delta s_{ab}'(\lambda)$ determined above, and using precisely known geometry and placement of the data capture devices in the aperture-plane, determine the closure phase, $\phi_3(\lambda)$, using Equation (9). Note that $\phi_3(\lambda)$ denotes the closure phase obtained from the principal NPCs of the fringes, while $\psi_3(\lambda)$ denotes the general closure phase that corresponds to principal, second-order, or even higher-order fringe NPCs.

FIGS. 3A-C and FIGS. 6 through 10 illustrate the geometric details involved in the methods described herein. Guided by Equation (9), calculate the statistical uncertainties on the fringe position measurements based on the expected RMS phase error (reciprocal of the signal-to-noise ratio, S/N, of the detected fringe), times the fringe spacing (reciprocal of the voltage detector spacing in wavelengths, $u_{ab}$) divided by $2\pi$. The S/N of each visibility listed in Table 1 is obtained by the flux density of the target object divided by the thermal noise per visibility. Note that, since the NPC lines are one-dimensional, these error bars will be perpendicular to a given NPC, i.e. a given visibility provides no information on the position along the fringe itself.

For comparison, it is also possible to calculate the closure phase using the visibilities themselves, meaning in the aperture-, or the Fourier-domain. From the phases of the individual calibrated visibilities on the closed triangle of baselines, one can calculate the closure phase using Equation (4). The error bar was again calculated as a reciprocal of the S/N of the measurement. The phase error per visibility in the high signal to noise case is simply 1/(S/N) in radians. The closure phase is the sum of three visibility phases. Hence the noise increases, by a factor of $\sqrt{3}$ in the measured closure phase.

TABLE 2

Results of closure phase measurements for different examples in Table 1 using different methods. The text in parenthesis denotes calibration status (C = calibrated, U = uncalibrated).

| Method | Example 1 (JVLA 3C286) | Example 2 (JVLA Cygnus A) | Example 3 (EHT M87) |
|---|---|---|---|
| Vertex of three-fringe interferogram (Image plane) Equation (9) | 1.7° ± 1.3° (C) <br> 2° ± 1.3° (U) | 112.9° ± 1.5° (C) <br> 112.9° ± 1.5° (U) | 37.4° ± 20° (C) <br> 41° ± 20 (U) |
| "Product of Areas" (Image plane) Equation (10) | ≈0° <br> ≈0° | 112.5° (C) <br> 113.7° (U) | 37.1° (C) <br> 40.6° (U) |
| Sum of visibility phases (Aperture plane) Equation (4) | 2.6° ± 0.74° (C) <br> 2° ± 0.74° (U) | 112.7° ± 0.3° (C) <br> 112.7° ± 0.3° (U) | 37.9° ± 15° (C) <br> 37.1° ± 0.3° (U) |

Both the image plane and visibility plane methods yield closure phases that are consistent with each other, within the errors, both for calibrated and uncalibrated data, thereby validating the image-plane methods.

Generalization to a Closed Loop of N Detectors

The relations established for closure phases on a triad can be used to extend the results to a generic N-polygon array of data capture devices. An N-polygon can be decomposed into N−2 adjacent and elemental triads with each adjacent pair sharing a side and all such triads sharing a common vertex as shown in FIG. 11. The net closure phase on the N-polygon is the sum of the closure phases on the adjacent elemental triads as defined above. This is possible because the interferometric phase measured by the detector spacing on the shared side between adjacent triads appears as the negative of itself in the adjacent triad and thus vanishes perfectly in the net sum.

As presented earlier, without loss of generality, the vertex of intersection between the NPC of fringes $F_{12}$ ($\hat{s}$, $\lambda$) and $F_{N1}(\hat{s}, \lambda)$ can be chosen as the phase center. In this case, the fringes $F_{12}(\hat{s}, \lambda)$ and $F_{N1}$ ($\hat{s}$, $\lambda$) pass through the so-chosen phase center and thus the interferometric phases on these two fringes vanish. The net closure phase on the N-polygon is then determined by the rest of the N−2 fringe NPCs. This is illustrated in FIG. 11.

The net closure phase is obtained by summing the closure phases of each of the adjacent triads, which are effectively identical to the phase offsets corresponding to these perpendiculars, $\psi_{ab}'(\lambda)$, a=1, 2, . . . N and b=(a+1)mod N. Thus:

$$\psi_N(\lambda) = \sum_{q=1}^{N-2} \psi_{3(q)}(\lambda) = \sum_{a=1}^{N} \psi'_{ab}(\lambda), \ b = (a+1) \bmod N \quad (11)$$

where, the subscript q indexes the N−2 adjacent triads constituting the N-polygon, and $\psi_{3(q)}(\lambda)$ denotes the closure phase on triad q. Note that, by choice of the phase center adopted here, $\psi_{12}'(\lambda)=\psi_{N1}'(\lambda)=0$. Equation (11) is a generalization of equation (8) for the N-polygon.

The relations established between the areas enclosed by the triad of data capture devices and the corresponding fringes in the aperture and image domains respectively, and the closure phases can also be generalized to a closed loop of N data capture devices. For the same choice of phase center described above, using equations (10) and (11), the area relation in Equation (10) generalizes to $$\psi_N^2(\lambda) = 16\pi^2 \sum_{q=1}^{N-2} A_{A3(q)}(\lambda) A_{I3(q)}(\lambda) + 2 \sum_{q=1}^{N-3} \sum_{r=q+1}^{N-2} \psi_{3(q)}(\lambda) \psi_{3(q)}(\lambda) \quad (12)$$

Equivalently, equations (10) and (11) can also be expressed as $$A_{AN}(\lambda) = \sum_{q=1}^{N-2} A_{A3(q)}(\lambda) = \frac{1}{16\pi^2} \sum_{q=1}^{N-2} \frac{\psi_{3(q)}^2(\lambda)}{A_{I3(q)}(\lambda)}. \quad (13)$$

Here, the subscripts A and I denote the aperture- and image-plane, respectively, and the subscripts 3 and N denote a triangle (3-polygon) and an N-polygon, respectively.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A method of eliminating corrupting influences from features and characteristics in interferometric images, comprising the steps of:
   positioning a plurality of data capture devices in an aperture-plane;
   directing each data capture device toward a target object in an image-plane;
   capturing an image of the target object by each of the plurality of data capture devices;
   obtaining image-plane data from the plurality of data capture devices, wherein the image-plane data is a linear combination of visibilities from pairs of the plurality of data capture devices;
   measuring a closure phase of the target object geometrically in the image-plane;
   removing corrupting influence from the image characteristics based on the measured closure phase to remove an influence of a propagation medium or a measurement apparatus from morphological characteristics in the image; and
   outputting the uncorrupted image morphological characteristics of the target object.

2. The method of claim 1, wherein, relying on a Shape-Orientation-Size conservation principle, an image constructed from three visibilities in a closed loop of data capture devices conserves the shape, orientation, and size of a triangle formed in the image plane by three Null Phase Curves, independent of phase contributions by measurement elements, or propagation medium, with the only degree of freedom being translation of the image, and the image represents a true image of the target object reconstructed from the plurality of data capture devices, independent of element-based calibration.

3. The method of claim 1, wherein the corrupting influences are removed from the image characteristics without calibration.

4. The method of claim 1, wherein the closure phase is not estimated in the aperture-plane.

5. The method of claim 1, wherein the image is captured from at least one of electromagnetic waves and acoustic waves, and the plurality of data capture devices are one of passive and active remote sensing.

6. The method of claim 1, wherein the image is obtained in an interferometer array.

7. The method of claim 1, wherein there are at least three data capture devices.

8. The method of claim 7, wherein the closure phase corresponds to an angular offset of an intersection of null phase curves of the visibilities of two pairs of data capture devices from a null phase curve of the visibility of the third pair of data capture devices.

9. The method of claim 8, wherein the closure phase is obtained by summing the closure phases of adjacent triads of data capture devices.

10. The method of claim 7, wherein an area enclosed in the image-plane by null phase curves of the visibilities from the pairs of data capture devices is proportional to the closure phase squared divided by an area enclosed by the data capture devices in the aperture-plane.

11. The method of claim 10, wherein the closure phase is based on an area within a closed loop of three data capture devices.

12. The method of claim 1, wherein the outputted image characteristics have a degree of symmetry in the target object's spatial intensity distribution.

* * * * *